United States Patent
Zhang et al.

(10) Patent No.: US 8,244,486 B2
(45) Date of Patent: Aug. 14, 2012

(54) STRUCTURAL HEALTH MONITORING SYSTEM HAVING MEMORY ON STRUCTURE

(75) Inventors: Chang Zhang, Santa Clara, CA (US); Xinlin Qing, Cupertino, CA (US); Irene Li, Stanford, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 459 days.

(21) Appl. No.: 12/432,668

(22) Filed: Apr. 29, 2009

(65) Prior Publication Data
US 2010/0114503 A1  May 6, 2010

Related U.S. Application Data

(60) Provisional application No. 61/109,861, filed on Oct. 30, 2008.

(51) Int. Cl.
*G06F 19/00* (2011.01)

(52) U.S. Cl. ........... 702/42; 702/33; 702/55; 73/761; 73/799; 324/242; 324/240; 324/658

(58) Field of Classification Search .......... 702/33, 702/42, 55; 73/761, 799; 324/242, 659, 324/225, 235, 240, 241, 243, 658
See application file for complete search history.

(56) References Cited

U.S. PATENT DOCUMENTS

| | | | | |
|---|---|---|---|---|
| 7,174,255 B2* | 2/2007 | Giurgiutiu et al. | ............... | 702/35 |
| 7,322,244 B2* | 1/2008 | Kim | ............... | 73/587 |
| 7,584,075 B2* | 9/2009 | Kim | ............... | 702/183 |
| 7,590,510 B2* | 9/2009 | Kim | ............... | 702/183 |
| 7,596,470 B2* | 9/2009 | Kim | ............... | 702/183 |
| 7,930,128 B2* | 4/2011 | Beard | ............... | 702/117 |
| 2005/0075846 A1* | 4/2005 | Kim | ............... | 703/1 |
| 2005/0114045 A1* | 5/2005 | Giurgiutiu et al. | ............... | 702/35 |
| 2006/0144997 A1* | 7/2006 | Schmidt et al. | ............... | 244/100 R |
| 2007/0012112 A1* | 1/2007 | Kim | ............... | 73/594 |
| 2007/0260425 A1* | 11/2007 | Kim | ............... | 702/182 |
| 2007/0260427 A1* | 11/2007 | Kim | ............... | 702/185 |
| 2007/0265806 A1* | 11/2007 | Kim | ............... | 702/187 |
| 2007/0265808 A1* | 11/2007 | Kim | ............... | 702/188 |
| 2008/0255771 A1* | 10/2008 | Beard | ............... | 702/34 |
| 2009/0306907 A1* | 12/2009 | Ihn et al. | ............... | 702/34 |
| 2010/0319452 A1* | 12/2010 | Masuda | ............... | 73/594 |

* cited by examiner

*Primary Examiner* — Carol Tsai
(74) *Attorney, Agent, or Firm* — Innovation Counsel LLP

(57) ABSTRACT

Storage of information, such as baseline information and structure ID, in a memory that is mounted on the structure, rather than inside the diagnosis hardware. This allows for faster and more convenient information retrieval. In particular, this approach allows for a more modular system in which different diagnosis hardware or other analyzers can be simply plugged into a structure's sensor network, whereupon they can quickly download any desired structure-specific information (e.g., baseline information, structure ID, and other useful information) from the on-structure memory.

19 Claims, 3 Drawing Sheets

STRUCTURAL HEALTH MONITORING SYSTEM HAVING MEMORY ON STRUCTURE

PRIORITY

This application claims the benefit of U.S. Provisional Patent Application No. 61/109,861, filed on Oct. 30, 2008, the entire content of which is hereby incorporated by reference.

BRIEF DESCRIPTION OF THE INVENTION

This invention relates generally to structural health monitoring. More specifically, this invention relates to a structural health monitoring system having an on-structure memory.

BACKGROUND OF THE INVENTION

Structural health monitoring seeks to determine the health of structures, typically by employing sensors/actuators distributed upon a structure. Actuators commonly query the structure, and sensors detect these querying signals, whereupon the detected signals are analyzed to determine whether any defects (e.g. cracks, pits, delaminations, etc.) or signs of failure have developed. Often, these detected signals are compared to a set of baseline signals, collected at some previous time and reflecting a previous, or baseline, state of the structure. Structural health monitoring systems that operate in this manner often have a sensor/actuator network attached to the structure being monitored, with diagnosis hardware and software located remote from the sensors. Baseline signal data are often stored remotely in the diagnosis hardware, and used to determine whether damage has occurred. However, it is often time-consuming for systems that monitor many structures to identify and retrieve baseline information for any single structure from among many different such data sets. Accordingly, it is desirable to improve the methods and apparatuses by which structural health monitoring information, including baseline signals, are stored and retrieved.

SUMMARY OF THE INVENTION

The invention can be implemented in a number of ways, including as a system and as a method.

In one embodiment, a structural health monitoring system comprises a flexible substrate configured for attachment to a structure, the flexible substrate having a plurality of sensors and a computer readable memory affixed thereon. The computer readable memory stores data corresponding to baseline signals, the baseline signals corresponding to first stress waves received from the structure at a first state of the structure. Additionally, the plurality of sensors is configured to receive second stress waves from the structure and to transmit second signals corresponding to the second stress waves, so as to facilitate a determination of a state of the structure according to a difference between the second signals and the baseline signals.

In another embodiment, a structural health monitoring system comprises a plurality of sensors configured for attachment to a structure, a computer readable memory configured for attachment to the structure, and an interface in electrical communication with the plurality of sensors and the computer readable memory. The computer readable memory stores data corresponding to baseline signals representing a baseline state of the structure.

In a further embodiment, a method of monitoring the health of a structure comprises, from a system having a plurality of sensors for analyzing a structure, and a computer readable memory, wherein the plurality of sensors and the computer readable memory are each affixed to the structure, retrieving from the computer readable memory a first set of data, the first set of data corresponding to baseline signals representing a baseline state of the structure. The method also includes transmitting first monitoring signals to the plurality of sensors, so as to transmit stress waves through the structure, and receiving diagnostic signals from the plurality of sensors, the diagnostic signals corresponding to ones of the transmitted stress waves received by the plurality of sensors. The received diagnostic signals are compared to the retrieved baseline signals.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS OF THE INVENTION

One aspect of the invention concerns the storage of information, such as baseline information and structure ID, in a memory that is mounted on the structure, rather than inside the diagnosis hardware. This allows for faster and more convenient information retrieval. In particular, this approach allows for a more modular system in which different diagnosis hardware or other analyzers can be simply plugged into a structure's sensor network, whereupon they can quickly download any desired structure-specific information (e.g., baseline information, structure ID, and other useful information) from the on-structure memory.

Figure 1A:
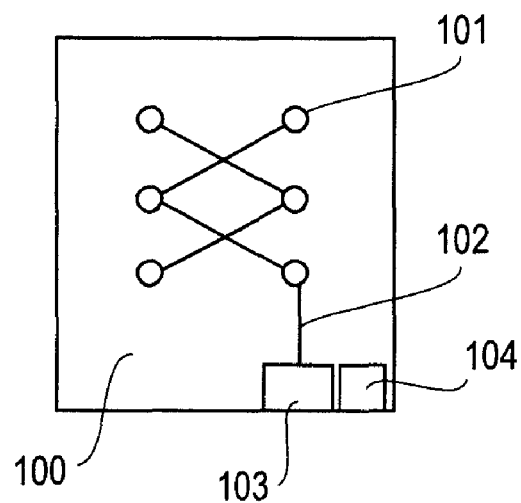
FIG. 1A illustrates a top view of a sensing layer manufactured in accordance with embodiments of the present invention.

Embodiments of the invention contemplate a sensor network and memory that can both be affixed to a structure. Often it is desirable for the network and memory to be first affixed to a flexible substrate. FIG. 1A illustrates one such flexible sensing layer for use in accordance with embodiments of the present invention. A diagnostic layer 100 is shown, which contains an array of sensors 101. The sensors 101 can be sensors capable of receiving signals used in structural health monitoring such as stress waves, and are connected to conductive traces 102. The layer 100 also contains a memory 104 that is a computer readable memory (e.g., any medium readable by a structural health monitoring diagnosis device). The memory 104 can store any computer readable data, including baseline signal data, a structure identifier, or the like. The traces 102 connect (or interconnect, if necessary) sensors 101 to an interface 103, which can be any electrical or electronic interface (e.g., I2C, SPI, USB, a long-distance serial interface such as LVDS, RS485, RS422, or the like) capable of supporting electrical connections between the sensors 101, memory 104, and an external device. While any interface may be utilized, some embodiments contemplate an interface utilizing a clock wire, ground wire, power wire, and one or more data wires. Additionally, it is contemplated that some interfaces are capable of supporting multiple cascaded memories 104 when additional capacity is desired, such as for large sensor networks. The memory 104 is also connected to the interface 103, so that a monitoring system can connect to the interface 103 to monitor the structure via the sensors 101, and read/write data from/to the memory 104.

Figure 1B:
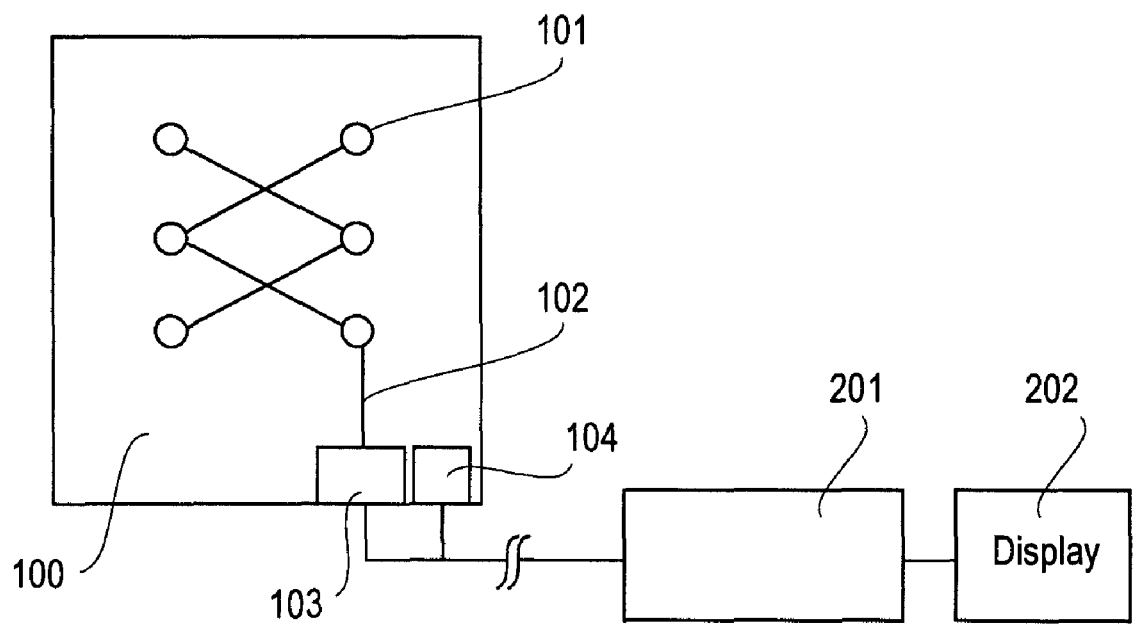
FIG. 1B illustrates a block diagram of a structural health monitoring system employing the sensing layer of FIG. 1A.

The diagnostic layer 100 and its operation are further described in U.S. Pat. No. 6,370,964 to Chang et al., which is hereby incorporated by reference in its entirety and for all purposes. Construction of the diagnostic layer 100 is also explained in U.S. Pat. No. 7,413,919 to Qing et al., which is also incorporated by reference in its entirety and for all purposes. It should be noted that the present invention is not limited to the embodiments disclosed in the aforementioned U.S. Pat. No. 7,413,919, but instead encompasses the use of flexible sensor layers having any configuration. For illustration, FIG. 1B further describes aspects of the operation of the diagnostic layer 100. In operation, an external analysis unit is connected to the layer 101 via the interface 103. The analysis unit can be any unit capable of conducting structural health monitoring using sensors 101. Here, the analysis unit includes diagnostic hardware 201 and display 202. The diagnostic hardware 201 is simply any computer hardware configured to send and retrieve data, as well as transmit and receive sensor signals. As one example, the diagnostic hardware 201 can be a computer with an analyzer card for sending and receiving sensor signals, as well as software for analyzing the resulting data. The diagnostic hardware 201 outputs its information to display 202.

In certain embodiments, the flexible layer 100 is first attached to a structure in a manner that allows the sensing elements 101 to detect quantities related to the health of the structure. For instance, the sensors 101 can be sensors configured to detect stress waves propagated within the structure, and emit electrical signals accordingly. The analyzer 108 then analyzes these electrical signals in known manner, to assess various aspects of the health of the structure. For instance, detected stress waves can be analyzed to detect crack propagation within the structure, delamination within composite structures, or the likelihood of fatigue-related failure. Quantities such as these can then be displayed to the user via display 110. In other embodiments, the sensing elements 101 can be directly bonded or affixed to the structure. In particular, the sensing elements 101 and memory 104 can be embedded within a structure, such as between plies of a composite structure. In this case, the layer 100 may not be used, and the sensing elements 101 and memory 104 can themselves be directly embedded. Embodiments of the invention also contemplate any type of sensing element 101. In one embodiment, the sensing elements 101 are piezoelectric transducers capable of receiving signals from hardware 201 and generating corresponding stress waves in the structure, and also capable of receiving stress waves from the structure and generating corresponding electrical signals to be sent to the hardware 201 for analysis. Besides such sensor/actuators, the invention also contemplates use of other sensors and/or actuators, such as fiber optic transducers, strain gauges, or the like.

Figure 2:
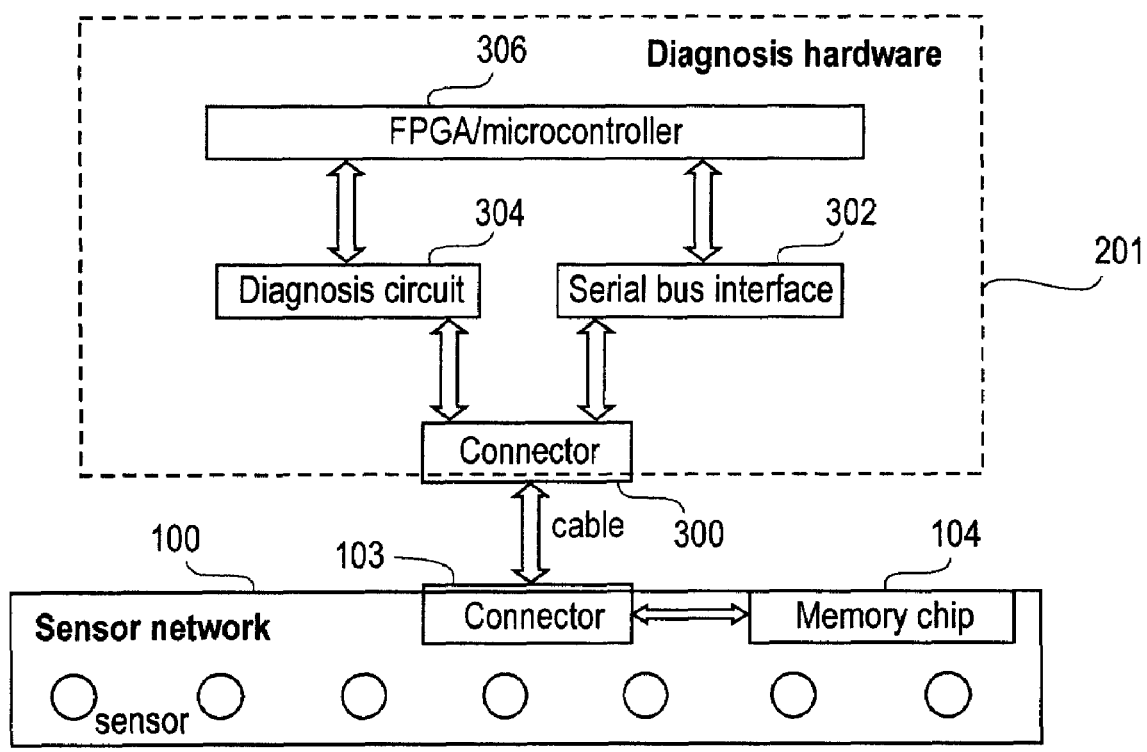
FIG. 2 illustrates block diagrams further describing the sensing layer and analysis unit of FIGS. 1A-1B.

FIG. 2 illustrates block diagrams further describing the diagnostic layer 100 and diagnostic hardware 201. The diagnostic layer 100, as above, has a number of sensor/actuators 101 connected by wires (not shown) to connector 103. Connector 103 is also connected by wires to memory 104. Memory 104 can be any computer readable memory, such as a volatile or nonvolatile memory chip.

The connector 103 of the layer 100 is mated to its complementary connector 300, such as by a cable that allows the diagnostic hardware 201 to be located remotely from the layer 100. The connector 300 is connected to a diagnosis circuit 304 and serial bus interface 302, which in turn are connected to a microcontroller 306. The microcontroller 306 communicates with the memory 104 through the serial bus interface 302, and transmits/receives sensor signals via the diagnosis circuit 304. The diagnosis circuit 304 and serial bus interface 302 can be conventional components for controlling the operation of sensors/actuators and handling serial data transfer, respectively.

Figure 3:
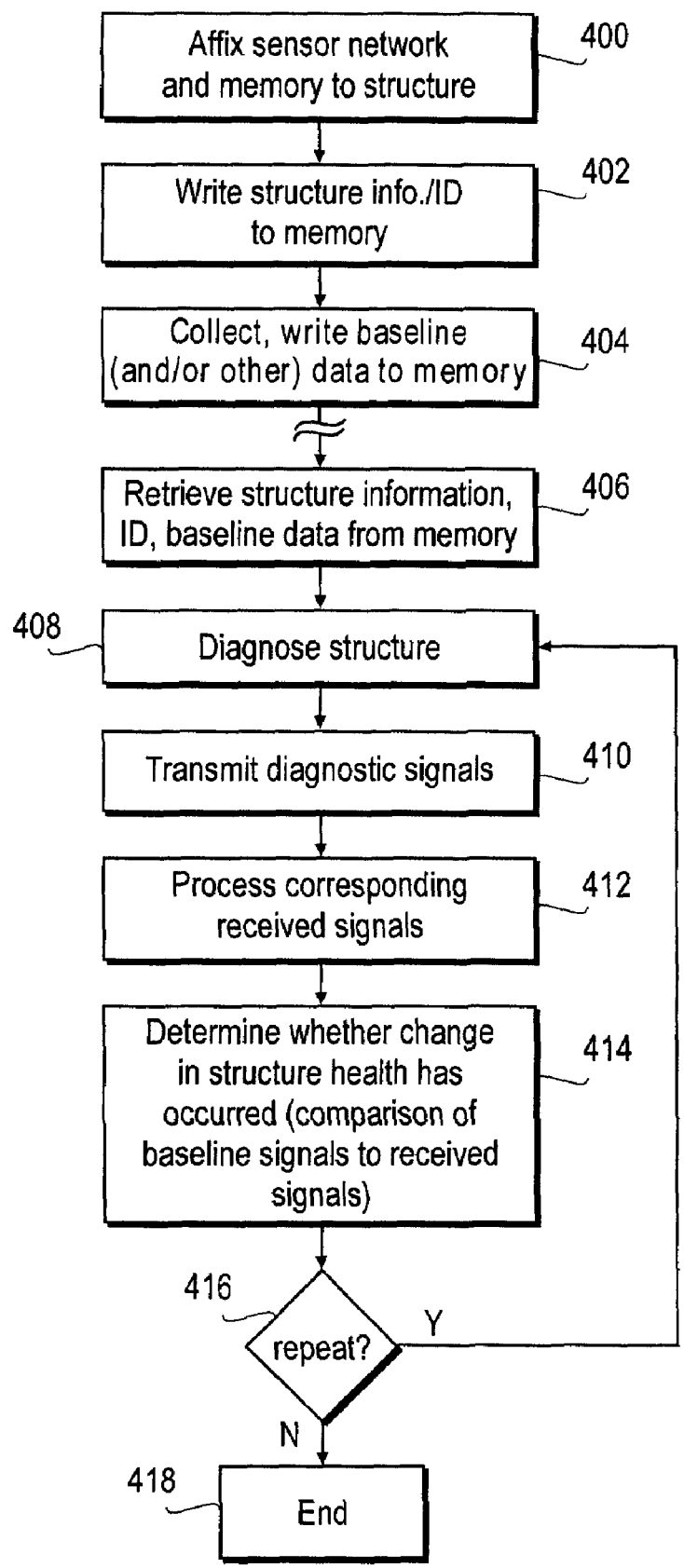
FIG. 3 is a flow chart describing operation of the sensing layer and analysis unit of embodiments of the present invention.

FIG. 3 is a flowchart illustrating further details of operation of the diagnostic layer 100 and diagnostic hardware 201 of FIG. 2. The sensor network and memory are first affixed to the structure to be monitored (Step 400). As above, the layer 100 can be affixed to a structure, typically to an external surface. Alternately, the sensing elements 101 and/or memory 104 can be embedded within the structure, either directly or along with layer 100. As is known, this affixing must be sufficient to couple the sensing elements 101 to the structure so that they can effectively generate and detect stress waves within the structure.

Once the sensing elements 101 and memory 104 are attached to the structure, the microcontroller 306 writes structure information to the memory 104 (Step 402). This structure information can be any appropriate information, but typically includes a structure identifier, or ID, that uniquely identifies the structure to be monitored. Also included can be information such as sensor locations on the structure, the identity of and/or location of sensor paths, frequencies of the diagnostic stress waves to be transmitted through the structure for monitoring, and any amplifier gains used in amplifying electrical signals sent to the sensing elements 101. In this manner, all information used in monitoring the structure is located in a single memory 104 for convenient access. In particular, storage of this information allows microcontroller 306 to quickly retrieve information indicating which structure is to be monitored, where on the structure the monitoring sensors are placed, what paths are to be used between these sensors, and the signal shapes to be used in diagnosing the structure, as well as the amplifier gains that should be used (i.e., what signals should be sent to each sensor, what those signals should look like, and how strong they should be).

Once this information is known, i.e. once the microcontroller 306 retrieves this information, it can collect baseline data and write it to memory 104 (Step 404). In one embodiment, the baseline data are data corresponding to those stress waves which were detected from known diagnostic signals transmitted through the structure. That is, for one or more known sensor paths, known diagnostic signals are sent to one actuator along the path, generating stress waves having a known shape. The stress waves travel along the sensor path and are altered by the structure, whereupon the altered waves are received at a sensor at the end of the path, and converted back to electrical signals. These signals, corresponding to the stress waves detected at the end of the path, are representative of the "baseline" state of the structure along that path, at the time the signals were collected. This signal data is then stored in memory 104, for each desired sensor path. The end result of step 104 is thus, in some embodiments, a stored set of baseline signal data for each sensor path to be monitored.

The memory 104 now stores much, if not all, of the information required for monitoring the structure to which it is affixed. At any later time, this information can be retrieved (Step 406), and used to monitor or diagnose the structure (Step 408). Structure diagnosis involves transmitting diagnostic signals, i.e. a characteristic electric signal, to the sensing elements 101 (Step 410), for conversion to propagating stress waves. The stress waves then propagate along their sensor paths, where they are detected by other sensing elements 101, which in turn generate and send electric signals to the diagnosis circuit 304. The electric signals are processed by the diagnosis circuit 304 (Step 412), e.g., filtered and amplified as necessary for analysis. The microcontroller 306 then compares these received signals to the corresponding baseline signals it previously retrieved from memory 104 (Step 414) and, if differences between the two sets of signals are sufficiently significant, determines that a change in the health of the structure has occurred along the appropriate path(s). This comparison can be performed in any number of ways, such as by a comparison of any amplitudes between the received and baseline signals, comparison of phases, or by any other approach by which signals can be compared so as to determine differences of interest.

If and when repeated diagnosis of the structure is desired (Step 416), such as when periodic monitoring of the structure is desired, or when an impact or other event potentially affecting structural health is detected, diagnosis may be repeated by returning to step 408. Alternatively, the monitoring process may end (Step 418).

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the sensors and/or actuators of the invention, as well as the memory, may be affixed to a flexible substrate or directly attached to (or within) a structure. Additionally, any computer hardware components can be used to carry out storage and retrieval of information from the memory, as well as querying of the structure to determine changes in structural health. Finally, the memory can store any appropriate information, including structure IDs, baseline signal data, sensor paths, and other information. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A structural health monitoring system, comprising:
a flexible substrate configured for attachment to a structure, the flexible substrate having a plurality of sensors and a computer readable memory affixed thereon;
wherein the computer readable memory stores data corresponding to baseline signals, the baseline signals corresponding to first stress waves received from the structure at a first state of the structure; and
wherein the plurality of sensors is configured to receive second stress waves from the structure and to transmit second signals corresponding to the second stress waves, so as to facilitate a determination of a state of the structure according to a difference between the second signals and the baseline signals.

2. The structural health monitoring system of claim 1, wherein the computer readable memory further stores data corresponding to one or more of locations of the plurality of sensors on the structure, a structure identifier, a sensor path, a frequency of an excitation signal to be transmitted by the plurality of sensors, and an amplifier gain.

3. The structural health monitoring system of claim 1 wherein each of the sensors comprises a piezoelectric transducer.

4. The structural health monitoring system of claim 1 further comprising an interface affixed to the flexible substrate, the interface in electrical communication with the plurality of sensors and the computer readable memory.

5. The structural health monitoring system of claim 4 wherein the interface is a serial interface.

6. The structural health monitoring system of claim 1 wherein the flexible substrate is coupled to a surface of the structure.

7. The structural health monitoring system of claim 1 wherein the flexible substrate is embedded within the structure.

8. A structural health monitoring system, comprising:
a plurality of sensors configured for attachment to a structure;
a computer readable memory configured for attachment to the structure; and
an interface in electrical communication with the plurality of sensors and the computer readable memory;
wherein the computer readable memory stores data corresponding to baseline signals representing a baseline state of the structure; and
wherein the interface is a first interface configured for electrical connection to a second interface, the second interface being in electrical communication with an analysis device configured to retrieve the stored data from the computer readable memory, to receive monitoring signals from the plurality of sensors, the monitoring signals corresponding to stress waves propagated through the structure, and to determine a difference between the monitoring signals and the baseline signals.

9. The structural health monitoring system of claim 8 wherein the first and second interfaces are serial interfaces.

10. The structural health monitoring system of claim 8 further comprising a flexible substrate, wherein the plurality of sensors and the computer readable memory are affixed to the flexible substrate.

11. The structural health monitoring system of claim 8 wherein the computer readable memory further stores data corresponding to one or more of locations of the plurality of sensors on the structure, a structure identifier, a sensor path, a frequency of an excitation signal to be transmitted by the plurality of sensors, and an amplifier gain.

12. The structural health monitoring system of claim 8 wherein each of the sensors comprises a piezoelectric transducer.

13. The structural health monitoring system of claim 8 wherein the plurality of sensors, the computer readable memory, and the interface are coupled to a surface of the structure.

14. The structural health monitoring system of claim 8 wherein the plurality of sensors, the computer readable memory, and the interface are embedded within the structure.

15. A method of monitoring the health of a structure, comprising:
from a system having a plurality of sensors for analyzing a structure, and a computer readable memory, wherein the plurality of sensors and the computer readable memory are each affixed to the structure;

retrieving from the computer readable memory a first set of data, the first set of data corresponding to baseline signals representing a baseline state of the structure;

transmitting first monitoring signals to the plurality of sensors, so as to transmit stress waves through the structure;

receiving diagnostic signals from the plurality of sensors, the diagnostic signals corresponding to ones of the transmitted stress waves received by the plurality of sensors; and comparing the received diagnostic signals to the retrieved baseline signals.

16. The method of claim 15 wherein the retrieving further comprises retrieving from the computer readable memory a second set of data, the second set of data comprising one or more of locations of the plurality of sensors on the structure, a structure identifier, a sensor path, a frequency of an excitation signal to be transmitted by the plurality of sensors, and an amplifier gain.

17. The method of claim 15 further comprising updating data stored on the computer readable memory.

18. The method of claim 17 wherein the updating further comprises writing to the computer readable memory an updated first set of data corresponding to updated baseline signals.

19. The method of claim 17 wherein the updating further comprises writing to the computer readable memory an updated second set of data, the updated second set of data corresponding to one or more of updated locations of the plurality of sensors on the structure, an updated structure identifier, an updated sensor path, an updated frequency of an excitation signal to be transmitted by the plurality of sensors, and an amplifier gain.

* * * * *